United States Patent
Tschernezki et al.

(10) Patent No.: US 11,275,989 B2
(45) Date of Patent: Mar. 15, 2022

(54) PREDICTING WILDFIRES ON THE BASIS OF BIOPHYSICAL INDICATORS AND SPATIOTEMPORAL PROPERTIES USING A LONG SHORT TERM MEMORY NETWORK

(71) Applicant: SAP SE, Walldorf (DE)

(72) Inventors: Vadim Tschernezki, Heidelberg (DE); Oliver Blum, Heidelberg (DE); Hinnerk Gildhoff, Neckargemünd (DE); Michèle Wyss, Edingen-Neckarhausen (DE); Bjoern Deiseroth, Heidelberg (DE); Wenzel Svojanovsky, Mannheim (DE)

(73) Assignee: SAP SE, Walldorf (DE)

( * ) Notice: Subject to any disclaimer, the term of this patent is extended or adjusted under 35 U.S.C. 154(b) by 917 days.

(21) Appl. No.: 15/601,739

(22) Filed: May 22, 2017

(65) Prior Publication Data

US 2018/0336452 A1 Nov. 22, 2018

(51) Int. Cl.
*G06N 3/04* (2006.01)
*G06N 3/08* (2006.01)

(52) U.S. Cl.
CPC ......... *G06N 3/0445* (2013.01); *G06N 3/0454* (2013.01); *G06N 3/082* (2013.01); *G06N 3/084* (2013.01)

(58) Field of Classification Search
CPC .......................... G06N 3/0445; G06N 3/0454
See application file for complete search history.

(56) References Cited

U.S. PATENT DOCUMENTS

| | | | |
|---|---|---|---|
| 9,449,344 B2 | 9/2016 | Deshpande et al. | |
| 9,477,745 B2 | 10/2016 | Tyercha et al. | |
| 9,507,815 B2 | 11/2016 | Tyercha et al. | |
| 9,613,055 B2 | 4/2017 | Tyercha et al. | |
| 10,671,912 B2 | 6/2020 | Gottfried et al. | |
| 2006/0161467 A1 | 7/2006 | Kumar et al. | |

(Continued)

OTHER PUBLICATIONS

Hamadeh, Nizar, et al. "Studying the factors affecting the risk of forest fire occurrence and applying neural networks for prediction." 2015 SAI Intelligent Systems Conference (IntelliSys). IEEE, 2015. (Year: 2015).*

(Continued)

*Primary Examiner* — Kevin W Figueroa
(74) *Attorney, Agent, or Firm* — Fish & Richardson P.C.

(57) ABSTRACT

The present disclosure involves systems, software, and computer implemented methods for predicting wildfires on the basis of biophysical indicators and spatiotemporal properties. A method includes receiving a request for a wildfire prediction for at least one geographical area. At least one biophysical indicator is identified. Each biophysical indicator provides biophysical data for the at least one geographical area. The at least one biophysical indicator is provided to a long short term memory (LSTM) network. The LSTM network includes a convolutional neural network (CNN) for each of multiple LSTM units. Each LSTM unit and each CNN are associated with a historical time period in a time series. The LSTM is used to generate at least one prediction for wildfire risk for the at least one geographical area for an upcoming time period. The at least one prediction is provided responsive to the request.

20 Claims, 12 Drawing Sheets

(56) References Cited

U.S. PATENT DOCUMENTS

| | | | |
|---|---|---|---|
| 2015/0009331 A1* | 1/2015 | Venkatraman | B61L 23/041 |
| | | | 348/148 |
| 2015/0278603 A1 | 10/2015 | Boriah et al. | |
| 2016/0077238 A1 | 3/2016 | Eickelman et al. | |
| 2016/0099010 A1* | 4/2016 | Sainath | G10L 25/30 |
| | | | 704/232 |
| 2018/0336460 A1 | 11/2018 | Tschernezki et al. | |
| 2019/0012904 A1 | 1/2019 | Yusuf et al. | |
| 2020/0155881 A1 | 5/2020 | Tohidi et al. | |
| 2020/0155882 A1 | 5/2020 | Tohidi et al. | |

OTHER PUBLICATIONS

Sainath, Tara N., et al. "Convolutional, long short-term memory, fully connected deep neural networks." 2015 IEEE International Conference on Acoustics, Speech and Signal Processing (ICASSP). IEEE, 2015. (Year: 2015).*

Hohberg, Simon Philipp. "Wildfire smoke detection using convolutional neural networks." 21 Technical report, Freie Universitt Berlin, Berlin, Germany (2015). (Year: 2015).*

Maeda, Eduardo Eiji, et al. "Predicting forest fire in the Brazilian Amazon using MODIS imagery and artificial neural networks." International Journal of Applied Earth Observation and Geoinformation 11.4 (2009): 265-272. (Year: 2009).*

Bekker, James, and Chris Aldrich. "The cross-entropy method in multi-objective optimisation: An assessment." European Journal of Operational Research 211.1 (2011): 112-121. (Year: 2011).*

Wang, Jin, et al. "Dimensional sentiment analysis using a regional CNN-LSTM model." Proceedings of the 54th Annual Meeting of the Association for Computational Linguistics (vol. 2: Short Papers). 2016. (Year: 2016).*

Copernicus Global Land Service; Vegetation; pulled from the internet on May 8, 2017; <<http://land.copernicus.eu/global/themes/Vegetation>>.

Final Office Action issued in U.S. Appl. No. 15/601,704 dated Sep. 3, 2020, 21 pages.

Couce et al., "Statistical Parameter Estimation fora Cellular Automata Wildfire Model Based on Satellite Observations", 2010,Modelling, Monitoring and Managnnent of Forest Fires II, vol. 137, May 27, 2010, 5 pages.

Non-Final Office Action issued in U.S. Appl. No. 15/601,704, dated Jul. 23, 2020, 20 pages.

Verbickas et al., "Sky and Ground Detection Using Convolutional Neural Networks", Proceedings of the International Conference on Machine Vision and Machine Learning, vol. 64, Aug. 14, 2014, 10 pages.

* cited by examiner

PREDICTING WILDFIRES ON THE BASIS OF BIOPHYSICAL INDICATORS AND SPATIOTEMPORAL PROPERTIES USING A LONG SHORT TERM MEMORY NETWORK

BACKGROUND

An artificial neural network is a computational model based on a collection of artificial neurons which can be referred to as neural units. The artificial neural network can perform in a manner that is similar to the observed behavior of a biological brain's axons. Each neural unit can be connected to other neural units. In a recurrent neural network, connections between neural units form a directed cycle. In a feed-forward neural network, connections between neural units do not form a cycle.

A convolutional neural network (CNN) is a type of feed-forward neural network in which a connectivity pattern between neurons is based on the organization of the animal visual cortex. A CNN can be arranged into convolutional layers alternating with subsampling layers. A LSTM (Long Short-Term Memory) network is a type of recurrent neural network that includes LSTM units instead of, or in addition to, other network units. A LSTM unit is a recurrent network unit that is capable of remembering values for either long or short durations of time.

SUMMARY

The present disclosure involves systems, software, and computer implemented methods for predicting wildfires on the basis of biophysical indicators and spatiotemporal properties. A method includes receiving a request for a wildfire prediction for at least one geographical area. At least one biophysical indicator is identified. Each biophysical indicator provides biophysical data for the at least one geographical area. The at least one biophysical indicator is provided to a long short term memory (LSTM) network. The LSTM network includes a convolutional neural network (CNN) for each of multiple LSTM units. Each LSTM unit and each CNN are associated with a historical time period in a time series. The LSTM is used to generate at least one prediction for wildfire risk for the at least one geographical area for an upcoming time period. The at least one prediction is provided responsive to the request.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Wildfires can create substantial loss of property, life, income, and other damages. Considering these costs, an approach for assessing the wildfire risk for specific areas can be used to predict and plan for wildfire disasters. The ability to predict the risk of wildfires can be beneficial for helping safety services ensure public safety and for helping emergency services mitigate and reduce the impact of wildfires. Insurance companies can use wildfire predictions to improve estimates of insurance values and risks for specific areas.

Neural networks, including CNNs (Convolutional Neural Networks) and LSTM (Long Short-Term Memory) networks, can be utilized for prediction. A CNN can incorporate spatially local properties of wildfires. A LSTM network can include the architecture of a CNN and can account for the temporal properties of wildfires and vegetation states. Various biophysical indicators for geographical areas can be generated from satellite data, such as indicators for an amount of green and alive elements of the canopy, a thickness of a vegetation cover, an amount of visible and near-infrared light reflected by vegetation, or a dry biomass increase of the vegetation for a given geographical area.

A CNN and/or a LSTM neural network can be used to predict a wildfire risk for one or more geographical areas based on the generated biophysical indicators. The LSTM network can include multiple LSTM units that are associated with a time sequence. Each LSTM unit can use a CNN, with an output of a preceding CNN in the time sequence being used as an input for the next CNN. The CNNs can be trained using ground truth data that includes historical information about wildfires. A CNN and/or a LSTM network can output a set of wildfire predictions for the one or more geographical areas.

Figure 1:
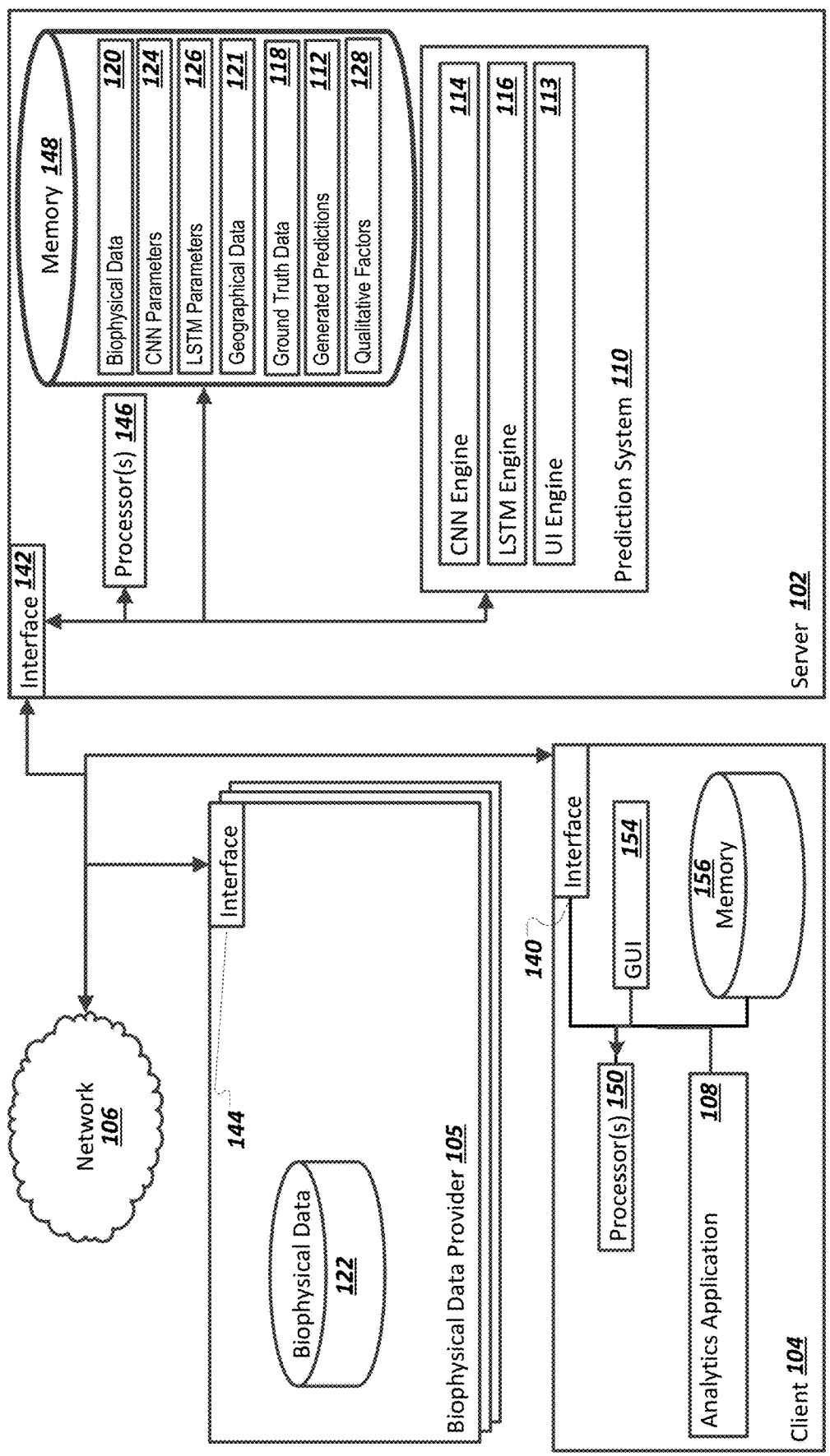
FIG. 1 is a block diagram of an example environment for predicting wildfires on the basis of biophysical indicators and spatiotemporal properties.

FIG. 1 is a block diagram illustrating an example system 100 for predicting wildfires on the basis of biophysical indicators and spatiotemporal properties. Specifically, the illustrated system 100 includes or is communicably coupled with a server 102, a client device 104, one or more external biophysical data providers including an external biophysical data provider 105, and a network 106. Although shown separately, in some implementations, functionality of two or more systems or servers may be provided by a single system or server. In some implementations, the functionality of one illustrated system or server may be provided by multiple systems or servers.

A user can use an analytics application 108 on the client device 104 to request generation of wildfire predictions for one or more geographical areas for an upcoming time period. The request can be sent to a prediction system 110 running on the server 102. The prediction system 110 can generate predictions 112, and provide the predictions 112 to the client device 104, for presentation in the analytics application 108. The predictions can be presented using one or more map interfaces generated by a UI (User Interface) engine 113, for example.

The prediction system 110 includes a CNN engine 114 and a LSTM engine 116. One or both of the CNN engine 114 and the LSTM engine 116 can be used to generate predictions 112. The LSTM engine 116 can use several CNN instances managed by the CNN engine 114, as described below.

A given CNN instance can be trained using ground truth data 118. The ground truth data 118 can include a Fire Occurrence Index (FOI). The FOI can be computed using two burned area maps $BA_{t1}$ and $BA_{t2}$ (where t1 and t2 are corresponding dates of measurement with t1<t2). If a pixel in a burned area map is not associated with a burned area in time step t=t1 but is associated with a burned area in a later time step t=t2 then a determination can be made that a fire occurred between t1 and t2 in the area. Thus, a true-value ($FOI_{t2}=1$) can be assigned to the pixel, whereas a false-value can be assigned otherwise ($FOI_{t2}=0$). Formally, the FOI can be defined using formula (1):

$$FOI_{t_2} = \begin{cases} 1 & \text{if } (BA_{t_1} = 0) \wedge (BA_{t_2} = 1) \\ 0 & \text{else} \end{cases} \quad (1)$$

Training can be performed using a stochastic optimization method. Samples can be balanced, for training purposes, so as to avoid the CNN engine 114 or the LSTM engine 116 trying to achieve low error rates by focusing on a majority class of non-wildfire areas. A ratio of wildfires to non-wildfires can be unbalanced for fitting and prediction purposes, since wildfires generally represent exceptional events. For instance, for an example data set, for each five samples which are labeled as wildfires more than 1300 samples may be labeled otherwise (for a ratio of wildfires to non-wildfires of 0.0037). An unbalanced ratio can be handled by applying under sampling (e.g., removing samples), such that the samples are balanced with respect to their classes.

The CNN, during training and during prediction, can take as input biophysical data 120, which may be received from the biophysical data provider 105 as biophysical data 122. The biophysical data 120 can include one or more of a vegetation index, a dry matter index, a leaf area index, and a fraction of absorbed photosynthetically active radiation index, as described in more detail below. The biophysical data provider 105 can provide a series of biophysical indicators on the status and evolution of land surface at global scale at mid and low spatial resolution. The biophysical data provider 105 can derive the biophysical data 122 by applying algorithms on satellite images, such as those produced by a space agency. The biophysical data 120 can be associated with geographical data 121 to map the biophysical data 120 to particular geographic locations.

A CNN can be configured by the setting of CNN parameters 124, such as a patch size, activation function selection, output neuron count selection for each layer, pool shape and pool strides for max pooling, and dropout probability thresholds. CNN parameters are described in more detail below. A single CNN can be used to generate predictions 112. A single CNN can include an input layer, a set of hidden layers (which can include convolution layers and fully connected layers), and an output layer. CNNs are described in more detail below with respect to FIG. 2.

As another example, multiple CNNs can be used in a LSTM network by the LSTM engine 116 to generate predictions 112. A LSTM network can be configured by the setting of LSTM parameters 126, such as a number of LSTM units, a time period length (e.g., fifteen days), a dropout keep probability, activation function selection, input vector length passed between CNN units, and other parameters. LSTM parameters and operation are described in more detail below with respect to FIGS. 3 and 4.

Performance of the predictions 112 can be quantified using qualitative factors 128, which can include a Receiver Operating Characteristic (ROC) and an "Area under the Curve" (AUC) score. As described in more detail below, the predictions can be evaluated with respect to the qualitative factors 128 by comparing prediction maps with the ground truth data 118. Categorical cross-entropy can be used as an objective function for evaluating the performance of the CNN engine 114 and the LSTM engine 116.

As used in the present disclosure, the term "computer" is intended to encompass any suitable processing device. For example, although FIG. 1 illustrates a single server 102 and a single client device 104, the system 100 can be implemented using a single, stand-alone computing device, two or more servers 102, or two or more client devices 104. Indeed, the server 102, the external biophysical data provider 105, and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 140, 142, and 144 can be used by the client device 104, the server 102, and the external biophysical data provider 105, respectively, for communicating with other systems in a distributed environment—including within the system 100—connected to the network 106. Generally, the interfaces 140, 142, and 144 each comprise logic encoded in software and/or hardware in a suitable combination and operable to communicate with the network 106. More specifically, the interfaces 140, 142, and 144 may each comprise software supporting one or more communication protocols associated with communications such that the network 106 or interface's hardware is operable to communicate physical signals within and outside of the illustrated system 100.

The server 102 includes one or more processors 146. Each processor 146 may be a central processing unit (CPU), a blade, an application specific integrated circuit (ASIC), a field-programmable gate array (FPGA), or another suitable component. Generally, each processor 146 executes instructions and manipulates data to perform the operations of the server 102. For example, each processor 146 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes the memory 148. In some implementations, the server 102 includes multiple memories. The memory 148 may include any type of memory or database module and may take the form of volatile and/or non-volatile memory including, without limitation, magnetic media, optical media, random access memory (RAM), read-only memory (ROM), removable media, or any other suitable local or remote memory component. The memory 148 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the platform server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the analytics application 108. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 150. Each processor 150 included in the client device 104 may be a central processing unit (CPU), an application specific integrated circuit (ASIC), a field-programmable gate array (FPGA), or another suitable component. Generally, each processor 150 included in the client device 104 executes instructions and manipulates data to perform the operations of the client device 104. Specifically, each processor 150 included in the client device 104 executes the functionality required to send requests to the server 102 and to receive and process responses from the platform server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 154.

The GUI 154 of the client device 104 interfaces with at least a portion of the system 100 for any suitable purpose, including generating a visual representation of the analytics application 122. In particular, the GUI 154 may be used to view a FCM, various Web pages, or other user interfaces.

Generally, the GUI 154 provides the user with an efficient and user-friendly presentation of business data provided by or communicated within the system. The GUI 154 may comprise a plurality of customizable frames or views having interactive fields, pull-down lists, and buttons operated by the user. The GUI 154 contemplates any suitable graphical user interface, such as a combination of a generic web browser, intelligent engine, and command line interface (CLI) that processes information and efficiently presents the results to the user visually.

Memory 156 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 156 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
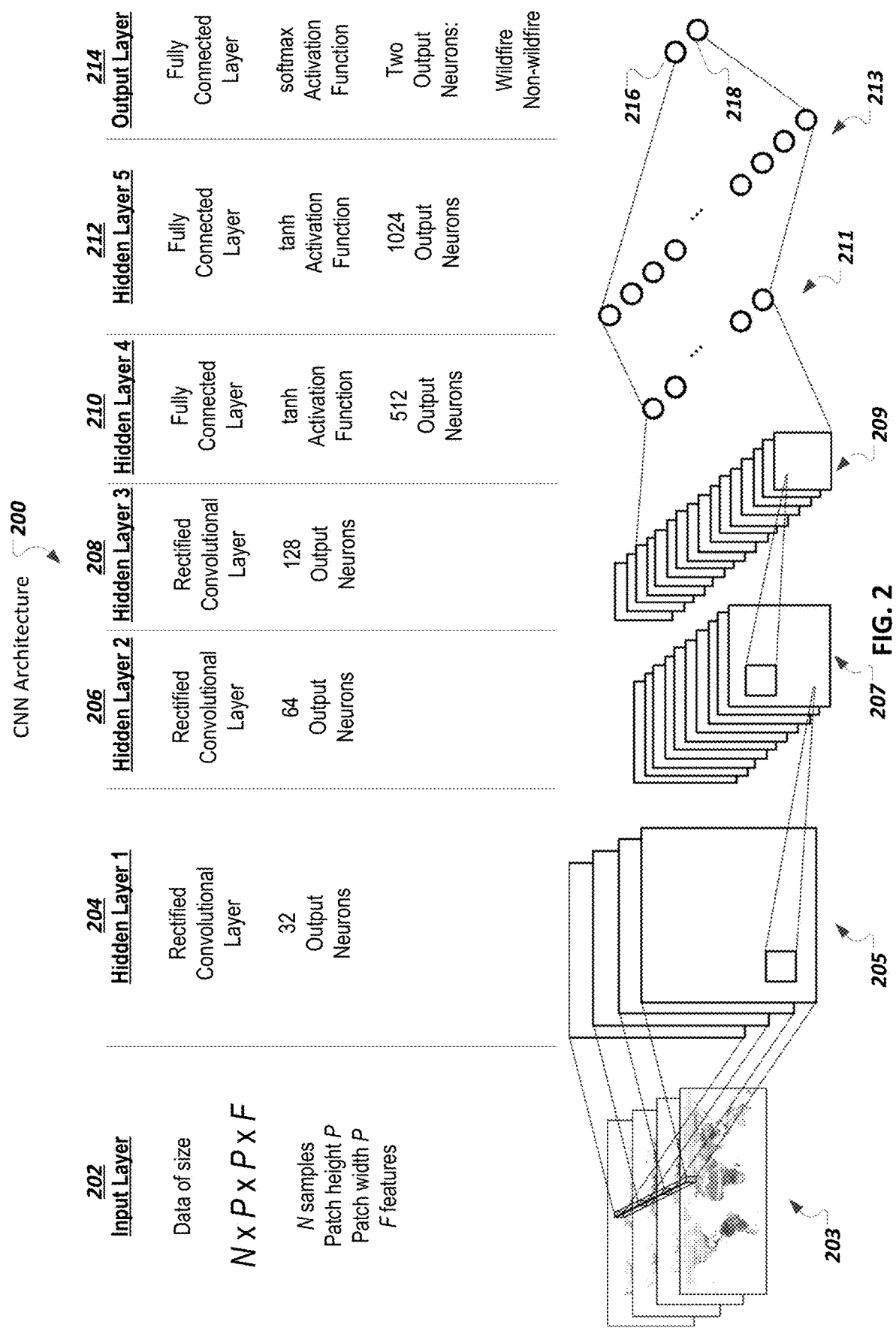
FIG. 2 illustrates layers of an architecture of a CNN.

FIG. 2 illustrates layers of an architecture 200 of a CNN. The architecture 200 includes several layers. For each layer, initial weights can be randomly selected from a normal distribution. An input layer 202 can provide input to the CNN. The input layer 202 can provide data of a size of N×P×P×F, where N is a number of samples, P is a patch height and width, and F is a number of features. The input layer 202 can require a partial preservation of the local structures of an image. Therefore, concatenated world maps can be split into equally sized parts, which can be defined as patches and represent the samples. For example, an image of size 256×256 can be split into 10 patches (samples), with the size of each patch equal to 16×16.

Regarding features, data for four features 203 for a given geographical area can be provided by the input layer 202 to a first hidden layer 204. The four features 203 can each be biophysical indicators, for example, and can be received from an external service. Raw data of each world map for a given date can be loaded into one or more arrays. The raw data for a geographic area can be divided into granules (e.g., tiles) and arrays can be stitched together to form stitched maps. A mask that includes references to invalid pixels (e.g., clouds, water surfaces) can be generated. The stitched maps can be transformed to patches for the CNN.

Biophysical indicators can be associated with values that indicate the vegetation for particular areas. A reduction in biophysical activity (e.g., vegetation) in an area can be associated, for example, with either a lack of resources such as water or an excess of solar activity, and either can increase the chance of wildfire in the area. Biophysical indicators can include Normalized Difference Vegetation Index (NDVI), Dry Matter Productivity (DMP), Leaf Area Index (LAI), and Fraction of Absorbed Photosynthetically Active Radiation (FAPAR).

The NDVI is a graphical indicator for quantifying the vegetation in an area. The NDVI can be based on the amount of visible and near-infrared light reflected by vegetation. Visible light (VIS) is absorbed mostly by healthy vegetation, but reflected by unhealthy vegetation, whereas for near-infrared (NIR) light, this relationship is generally inverted (NIR light is generally reflected by healthy vegetation but absorbed by unhealthy vegetation). The properties of VIS light and NIR light can be used when calculating the NDVI using formula (2) below:

$$NDVI = \frac{(NIR - VIS)}{(NIR + VIS)} \quad (2)$$

The DMP indicator can measure the overall growth rate or dry biomass increase of vegetation in an area, and can be expressed as kilograms of dry matter per hectare per day (kgDM/ha/day). The calculation of DMP can include biophysical variables such as canopy water content, surface temperature and leaf phenology. Since DMP estimates the increase of dry biomass, high DMP values can indicate vegetation areas, for example. As another example, low DMP values can be indicative of plants losing high quantities of dry biomass due to a drought.

The LAI quantifies the thickness of the vegetation cover in an area. The LAI can be derived from satellite images and can correspond to a total green area of all the canopy layers in an area, including the under-story, which may represent a very significant contribution to the LAI, especially for forests. The LAI can be defined as half the developed area of photosynthetically active elements of the vegetation per unit horizontal ground area.

The FAPAR indicator can refer to amounts of green and alive elements of the canopy and can depend on canopy structure, vegetation element optical properties, and angular configuration. Although related to the canopy like LAI, a FAPAR value can quantify a fraction of the solar radiation absorbed by live leaves for photosynthesis activity.

Other indicators can be used, such as raw image data (with images of a same width, height and time interval, for example), FCOVER (Fraction of Vegetation Cover), VCI (Vegetation Condition Index), or other indicators. FCOVER measures a fraction of ground covered by green vegetation, quantifies a spatial extent of vegetation, is independent from the illumination direction and is sensitive to a vegetation amount. The VCI compares a current NDVI to a range of values observed in a same period in previous years. The VCI can be expressed as a percentage and provides an indication where an observed value is situated between extreme values (minimum and maximum) in previous years. Lower and higher VCI values indicate bad and good vegetation state conditions, respectively.

Each of the features 203 can share some or all of several characteristics. Each data set can be for a particular number of days (e.g., 10 days), a particular spatial resolution (e.g., one square kilometer), use a particular value range (e.g., 0-255 as an unsigned 8 bit integer), use a particular data format (e.g., Hierarchical Data Format 5 (HDF5), use a particular type of geographic projection (e.g., regular latitude-longitude), use a particular geodatical datum (e.g., WGS84 (World Geodetic System 84), and use a particular pixel size and accuracy (e.g., 1/336° and minimum 10 digits accuracy). Each data set may include invalid values, which can be caused, for example, by clouds, snow, sea, or other factors.

Each data set in a feature 203 can be identified using an identifier that includes a horizontal and vertical component. For instance, an example identifier is: g2_BIOPAR_NDVI_2016080 10000_H21V4_PROBAV_V2.1, where NDVI is a product type generated with PROBAV satellite data with an algorithmic approach of version 2.1 on the date 1 Aug. 2016 with a position or location identifier of H21V4 relative to the whole map of data associated with the product. For example, H21V4 can mean position 21 out of 35 in the horizontal direction and 4 out of 15 in the vertical direction. A feature 203 may include, for example, 35×15=525 granules. However, some granules can represent a water surface, so less granules, e.g., 330, may be included in an actual data set. Each such granule can include a quicklook image, metadata, and actual data, which can be stored as an HDF5 file and used for model fitting and prediction.

A parser can be used to generate an overview about the input data and to evaluate subsequent predictions later on by comparing actual wildfires to predicted wildfires. The parser can extract data for a specific time range and initialize selected products and their granules for a specific date. The values of the granules values can be stored in an HDF5 file as an array of a particular size (e.g., size 1121×1121), and can be concatenated according to location identifier, which can result in a map. As mentioned previously, products can include invalid pixels (e.g., sea surface or clouds). The invalid values can be stored in a HDF5 file together with valid values and can represent the last values of an interval scale (e.g., values of 254 and 255). To avoid reducing the generalization of classifiers (e.g., categorical variables in interval scales), a mask can be used to skip the invalid values while training and predicting.

Referring again to FIG. 2, and as illustrated by an operation 205, the first hidden layer 204 is a rectified convolutional layer that uses data from the input layer 202 to generate output neurons (e.g., thirty two output neurons) for use by a second hidden layer 206. As illustrated by an operation 207, the second hidden layer 206 is a rectified convolutional layer that uses data from the first hidden layer 204 to generate output neurons (e.g., a larger number of output neurons than generated by the first hidden layer 204, such as sixty four) for use by a third hidden layer 208. As illustrated by an operation 209, the third hidden layer 208 is a rectified convolutional layer that uses data from the third hidden layer 208 to generate output neurons (e.g., a larger number of output neurons than generated by the second hidden layer 206, such as one hundred twenty eight), for use by a fourth hidden layer 210. Each of the hidden layers 204, 206, and 208 can use a L2-regularizer, with the outputs of each layer processed by local response normalization and by max-pooling using, for example, a pool shape of 2×2 and a pool stride of 1×1.

In general, for the convolutional layers, a number of maps, kernel sizes and skipping factors can characterize a given convolutional layer. On each convolutional layer, a kernel of size ($K_x$, $K_y$) can be shifted over a valid region of an input image (e.g., the kernel can be completely inside of the input image for each convolutional layer). Strides $S_x$ and $S_y$, which can control how the kernel convolves around the input image, can define an amount of pixels skipped by the kernel in x- and y-directions between subsequent convolutions. A shifting process can result in an output map for a layer with a size equal to the previous layer, if padding (adding additional values to the border of the image) is utilized.

The fourth hidden layer 210 is a fully connected layer that uses an activation function (e.g., a tan h function) and data from the third hidden layer 208 to generate output neurons 211 (e.g., a larger number of output neurons than generated by the third hidden layer 208, such as five hundred twelve) for use by a fifth hidden layer 212. The fifth hidden layer 212 is a fully connected layer that uses an activation function (e.g., a tan h function) and data from the fourth hidden layer 210 to generate output neurons 213 (e.g., a larger number of output neurons than generated by the fourth hidden layer 210, such as one thousand twenty four) for use by an output layer 214. For the fourth hidden layer 210 and the fifth hidden layer 212, neurons can be kept if a computed probability is more than a threshold (e.g., 0.5).

The output layer 214 is a fully connected layer that uses an activation function (e.g., a softmax function) and data from the fifth hidden layer 212 to generate two output neurons including a first output neuron 216 and a second output neuron 218 (e.g., one output neuron per class label). The first output neuron 216 represents a calculated likelihood of a wildfire for the geographical area for an upcoming time period (e.g., a next fifteen days). The second output neuron 218 represents a calculated likelihood of there not being a wildfire for the geographical area in the upcoming time period. Values for the first output neuron 216 and the second output neuron 218 can add up to one hundred percent.

When determining the first output neuron 216 and the second output neuron 218, to summarize the information about each patch, one of two approaches can be used. In a first approach, a patch can be labeled positive if the patch includes more than one pixel indicating a positive value and otherwise labeled negative. In a second approach, all positive occurrences in a patch can be counted and the patch can be labeled positive if the sum of the positive occurrences in the patch is above a predetermined threshold. The first approach can result in maps that include an unacceptable amount of more fire risk areas than the actual ground truth. Therefore the second approach may be preferable. For the second approach, the threshold can be optimized (e.g., to a ratio of eight pixels) so that the summarized ground truth includes substantially the same amount of wildfire endangered pixels as the original ground truth. With a threshold of eight, if a patch includes more than eight pixels indicating wildfire areas, then the whole patch can be labeled as wildfire endangered.

In further detail of the hidden layers, the resulting outputs of a topmost convolutional layer (e.g., the third hidden layer 208) can be combined by a fully connected layer (e.g., the fourth hidden layer 210) into a one-dimensional feature vector (e.g., the output neurons 211). In some implementations, to process information of a convolutional layer, kernel sizes of convolutional filters and max-pooling rectangles are used with a specific size and stride, such that the output maps of a last convolutional layer are downsampled to one pixel per map.

Max-pooling can be used as an efficient, non-linear method of down-sampling. Max-pooling can include partitioning an input image along each direction by a factor of K and $K_y$, into a set of non-overlapping rectangles of size ($K_x$, $K_y$). The output of a max-pooling layer can be calculated by taking a maximum activation of each rectangle. Max-pooling can eliminate non-maximal values, and such elimination can: 1) reduce computation for upper layers; and 2) provide position invariance over larger local regions, which can lead to faster convergence, selection of superior invariant features, and improved generalization.

Basic definitions of a neuron's output $f$ as a function of its input x can be represented either by $f(x)=(1+e^{-x})^{-1}$ or $f(x)=\tan h(x)$. These functions are saturating non-linear activation functions which can be slower than a ReLU (Rectified Linear Unit) function $f(x)=\max(0, x)$. The ReLU function may be neither saturating nor linear. A ReLU function can be used for faster training as compared to the saturating non-linear activation functions.

A ReLU function may not require input normalization to prevent saturation. Higher generalization can be achieved using a ReLU function by applying local response normalization, which is a procedure that is inspired by real neurons that stimulates the competition for big activities amongst neuron outputs computed using different kernels. The local response normalization can be applied after the ReLU nonlinearity in certain layers. Applying local response normalization can result in a lower test error rate.

A dropout method can be used to reduce the complexity of a neural network while training. In a dropout method, the output of each neuron can be retained with a probability p and set to 0 otherwise. Neurons which are dropped out do not participate in the feed-forwarding and back-propagation. Using dropout, neurons may not be able to rely on the presence of particular neurons, which can result in neurons learning more robust features that are useful in conjunction with many different random subsets of the other neurons, which can improve training.

Figure 3:
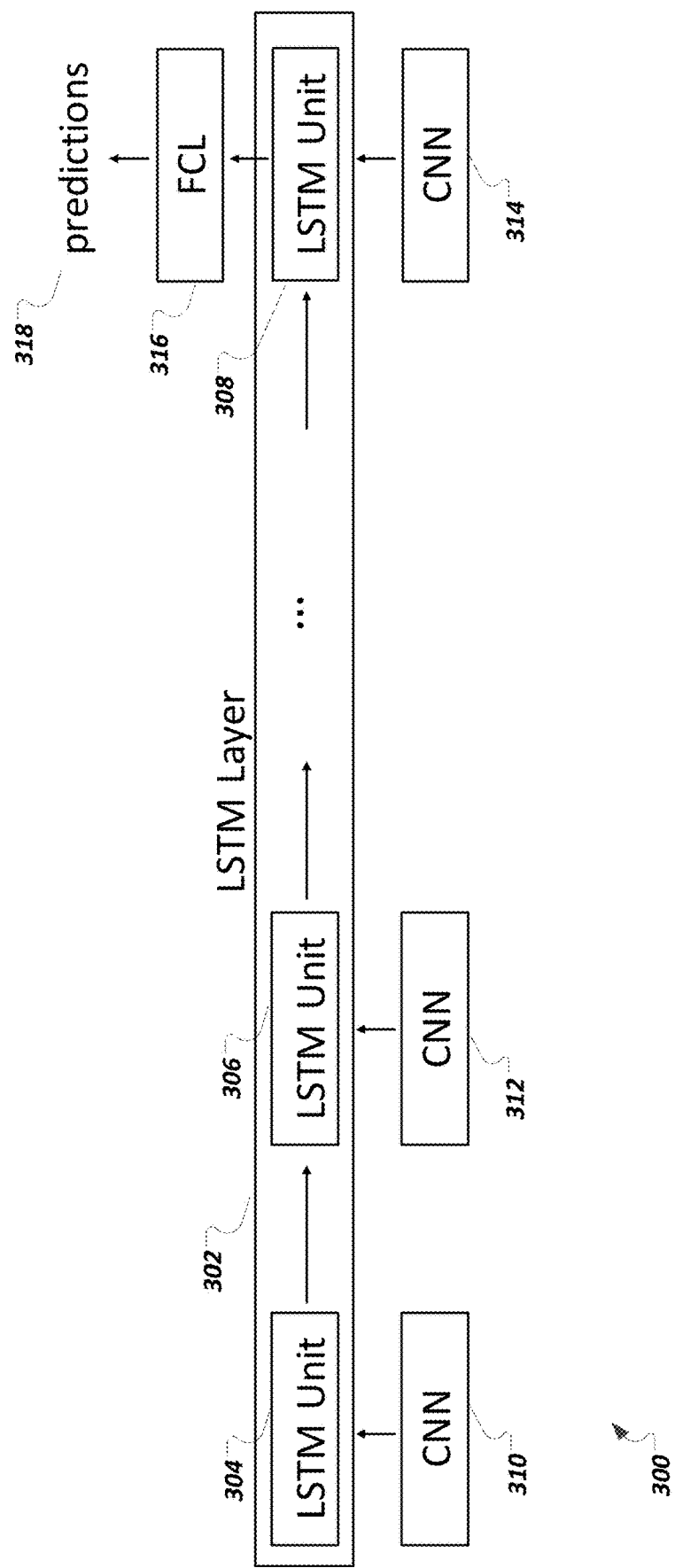
FIGS. 3 and 4 illustrate example LSTM networks.

FIG. 3 illustrates a LSTM network 300. The LSTM network 300 includes a LSTM layer 302 that includes a series of LSTM units including LSTM units 304, 306, and 308. As described in more detail below, each LSTM unit 304, 306, and 308 is respectively associated with a CNN 310, 312, or 314. Each LSTM unit 304, 306, or 308 uses a respective CNN 310, 312, or 314 to generate output data for use by a successive unit in the LSTM 300. A fully connected layer 316 can, using input from the last LSTM unit 308, generate predictions 318 that indicate a wildfire risk for a given geographical area.

In general, recurrent neural networks (RNN) such as the LSTM network 300 can be used to process sequential inputs such as time series. The architecture of RNNs is based on the neuron structures primarily found in the neocortex in the brain. RNNs can process every element of an input sequence successively and memorize crucial information in each step. The memorized information can be available in a next processing step. Each element can be processed using the same weights. RNNs can map an input sequence $x_t \in R^T$ to a sequence of hidden states $h_t \in R^N$ and an output sequence $z_t$ as shown in formulas (3) and (4) below $$h_t = g(W_{xh}x_t + W_{hh}h_{t-1} + b_h) \tag{3}$$

$$z_t = g(W_{hz} + b_z) \tag{4}$$

where $W_{xh}$, $W_{hh}$, $W_{hz}$ are weights, $b_h$, $b_z$ are biases, g is an activation function of the RNN layer, T is the length of the sequence and N is the number of hidden units. The computation of the hidden state $h_t$ can require a previous hidden state $h_{t-1}$. Accordingly, the RNN can iterate recursively over the input sequence $x_t$. The hidden state passed to the first RNN cell can be chosen as $h_0=0$.

The use of a memory unit which can be called cell state $C_t$ can overcome training difficulties caused by vanishing or exploding gradients. The memory unit can enable the network to learn when to forget previous information and when to update a cell state with the current hidden state. A LSTM cell can accept a previous cell state $C_{t-1}$, the hidden state of the previous cell $h_{t-1}$, and the input of the according time step $x_t$ as input. The resulting output can be the updated cell state $C_t$ and the hidden state $h_t$. A decision about which information to keep or throw away can be made in gate layers. Each gate layer can use a sigmoid function σ (or some other type of function), which can be referred to as an inner activation function of the LSTM layer. The output of the inner activation function can range between 0 and 1 (for each hidden unit) and can determine the extent to which information is memorized (e.g., when the σ function output is substantially equal to 1) or forgotten (e.g., when the σ function output is substantially equal to 0). A LSTM cell can include three gates that each take the hidden state of the previous cell $h_{t-1}$ and $x_t$ as input, including a forget gate layer, an input gate layer, and an output gate layer. The forget gate layer can be used to determine to which extent each value of the cell state is kept, using formula (5):

$$f_t = \sigma(W_f \cdot [h_{t-1}, x_t] + b_f) \quad (5)$$

The input gate layer can be used to determine to which extent the cell state is updated with the cell input of $h_{t-1}$ and $x_t$, using formula (6):

$$i_t = \sigma(W_i \cdot [h_{t-1}, x_t] + b_i) \quad (6)$$

The output gate layer can be used to determine to which extent output hidden state $h_t$ is kept, using formula (7):

$$o_t = \sigma(W_o \cdot [h_{t-1}, x_t] + b_o) \quad (7)$$

Using the three gate layers, an output of a LSTM cell can be computed using formulas (8), (9), and (10) below:

$$\tilde{C}_t = g(W_C \cdot [h_{t-1}, x_t] + b_C) \quad (8)$$

$$C_t = f_t * C_{t-1} + i_t * \tilde{C}_t \quad (9)$$

$$h_t = o_t * g(C_t) \quad (10)$$

where g is the activation function for the LSTM layer.

Figure 4:
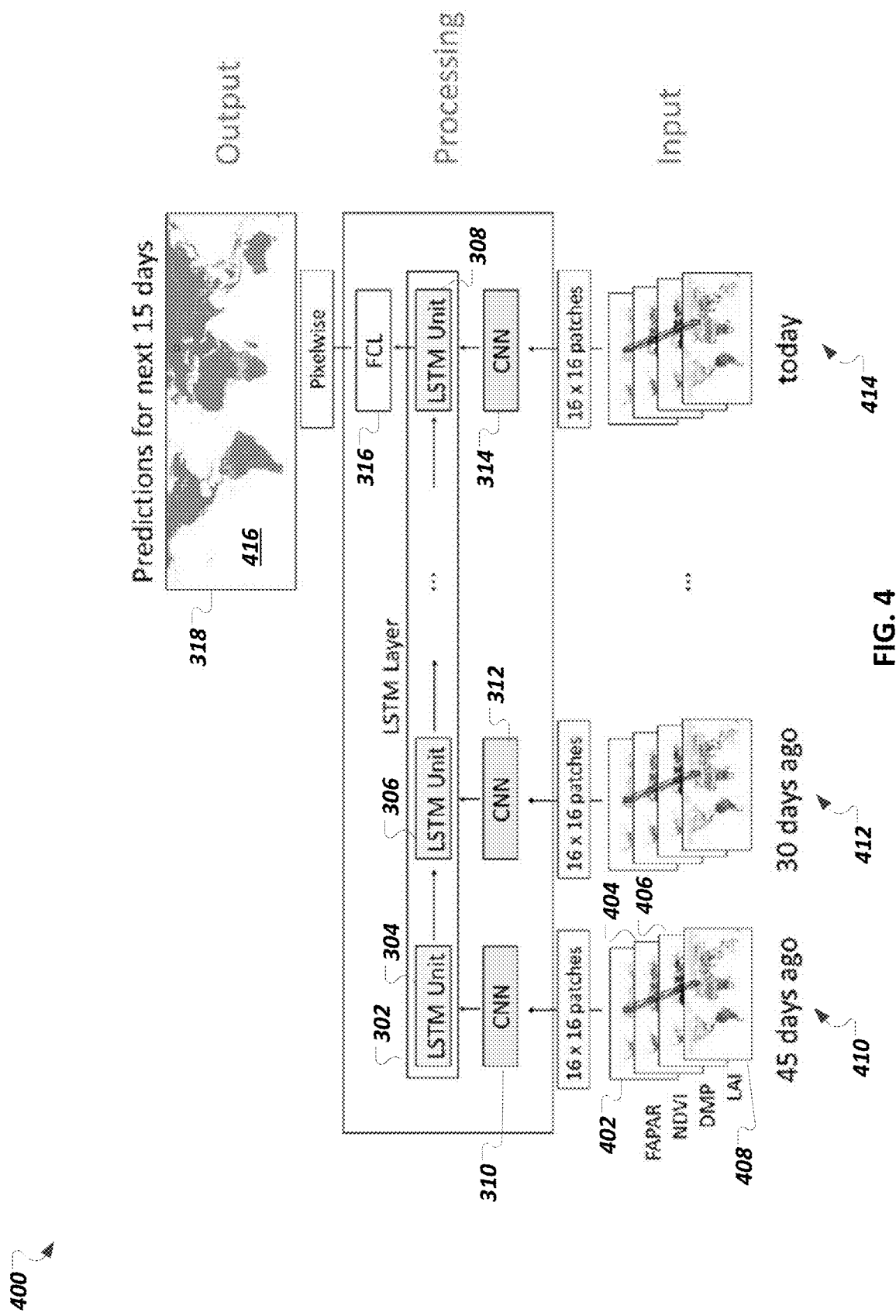

FIG. 4 illustrates a LSTM network 400. Similar to the LSTM network 300, the LSTM network 400 includes the LSTM layer 302 that includes a series of LSTM units including LSTM units 304, 306, and 308, with each LSTM unit 304, 306, and 308 respectively associated with the CNN 310, 312, or 314.

As described above with respect to FIG. 2, inputs to a respective CNN can include biophysical indicators. For example, FAPAR indicators 402, NDVI indicators 404, DMP indicators 406, and LAI indicators 408 can be inputted to the CNN 310 associated with the LSTM unit 302. The CNN 310 accepts input data from a time period of forty five days ago 410. Other CNNs can accept input data from more recent time periods. For example, the CNN 312 can accept data from thirty days ago 412, another (not shown) CNN can accept data from fifteen days ago, and the CNN 314 can accept current data 414. Although time windows of fifteen days are illustrated, other time window lengths can be used, including varying length time windows. Each of the CNNs can use common weights. A last two-neuron layer of a respective CNN can be omitted such that a previous CNN in the chain feeds an input vector with a length of 1024 into a successive corresponding LSTM cell. For example, the CNN 310 can generate a vector of length 1024 which can be accepted as input by the LSTM unit 306 for use by the CNN 312.

Several steps can be performed for LSTM layer setup. For example, for the training of the LSTM layer 302, a dropout keep probability can be determined. For example, a dropout keep probability of 0.7 can be used. An activation function, such as a hyperbolic tangent, can be selected. A number of hidden units can be selected, such as 512 hidden units. A number of time steps can be selected, such as four.

During prediction, the output of the CNNs can be passed to the LSTM layer 302. A hidden state of a last LSTM unit 308 can be passed to the fully connected layer 316 with two neurons for each pixel that represents a geographic area, with the two neurons representing probability of a wildfire and probability of not a wildfire (e.g., classes wildfire and non-wildfire), for a given geographic area, for an upcoming time period (e.g., the next fifteen days). A softmax activation function can be used for classification. Predictions 318 can be presented in a map 416, with different colors or other indications indicating different wildfire risks for different geographic areas presented on the map 416.

Figure 5B:
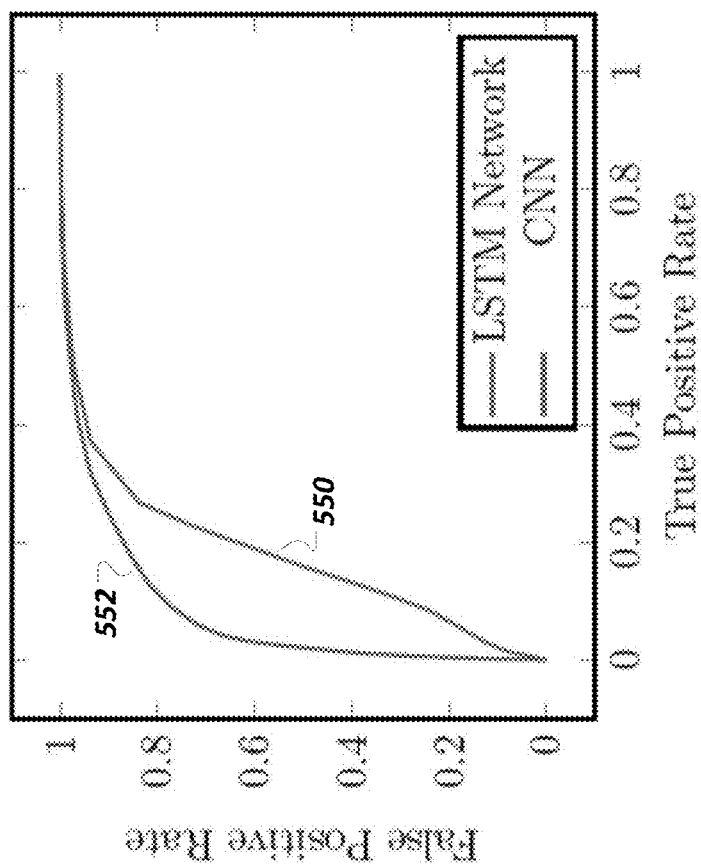
FIG. 5B illustrates example curves for performance evaluation.
Figure 5A:
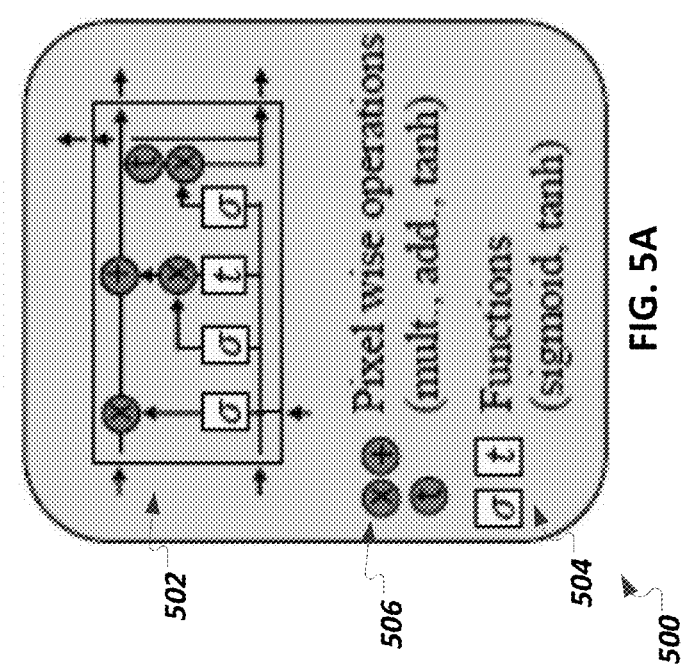
FIG. 5A illustrates an example LSTM unit.

FIG. 5A illustrates an example LSTM unit 500. As illustrated by a flow 502, various operations can be performed by the LSTM unit to transform a set of inputs into a set of outputs. For example, various functions 504 (e.g., sigmoid, tan h) and various pixel operations 506 (e.g., addition, multiplication) can be used.

FIG. 5B illustrates example curves 550 and 552 that can be used for performance evaluation. The curves 550 and 552 are receiver operating characteristic (ROC) curves. A ROC can be used for conclusions about distributions of wildfire endangered areas given a few distinct areas where a fire actually breaks out. The ROC curve can be based on two parameters: a true positive rate TPR and a false positive rate FPR, which can be formally defined as shown below:

$$TPR = \frac{T_p}{T_p + F_n} \quad (11)$$

$$FPR = \frac{F_p}{F_p + T_n} \quad (12)$$

where $T_p$ is true positives (e.g., number of samples correctly classified as positives (e.g., wildfire areas correctly classified as wildfire areas)), $T_n$ is true negatives (e.g., number of samples correctly classified as negatives (e.g., non-wildfire areas correctly classified as non-wildfire areas)), $F_p$ is false positives (e.g., number of negative samples incorrectly classified as positives (e.g., non-wildfire areas incorrectly classified as wildfire areas)), and $F_n$ is false negatives (e.g., number of positive samples incorrectly classified as negatives (wildfire areas incorrectly classified as non-wildfire areas)).

$F_p$ and $T_n$ can be typically within the same order of magnitude, so classifying too many areas as fire-endangered can be penalized while pertaining manageable values (in contrast to the precision). By adjusting a threshold on the prediction score, the TPR and/or the FPR can be improved. The ROC curves 550 and 552 can be constructed by plotting the FPR as a function of the TPR. A high-performing classifier maintains a high value of TPR even for a low value of FPR. Therefore an area under the curve (AUC) score can be utilized as a metric for measuring the performance of a classifier. For the example curves 550 and 552, the area under the curve 550 is 0.85 and the area under the curve 552 is 0.91, which can indicate that a LSTM network performed better than a CNN, for prediction.

Figure 6:
FIGS. 6 to 10 illustrate example user interfaces.

FIG. 6 illustrates an example user interface 600. The user interface 600 presents a color coded map 602 with various colors indicating various levels of wildfire risk for a given area. For example, as illustrated by a legend 604, wildfire risk levels can include very low, low, medium, high, and very high levels of risk. For instance, areas 606, 608, 610, 612, and 614 have risk levels of very low, low, medium, high, and very high, respectively, as indicated by respective colors used for the respective areas.

Figure 7:
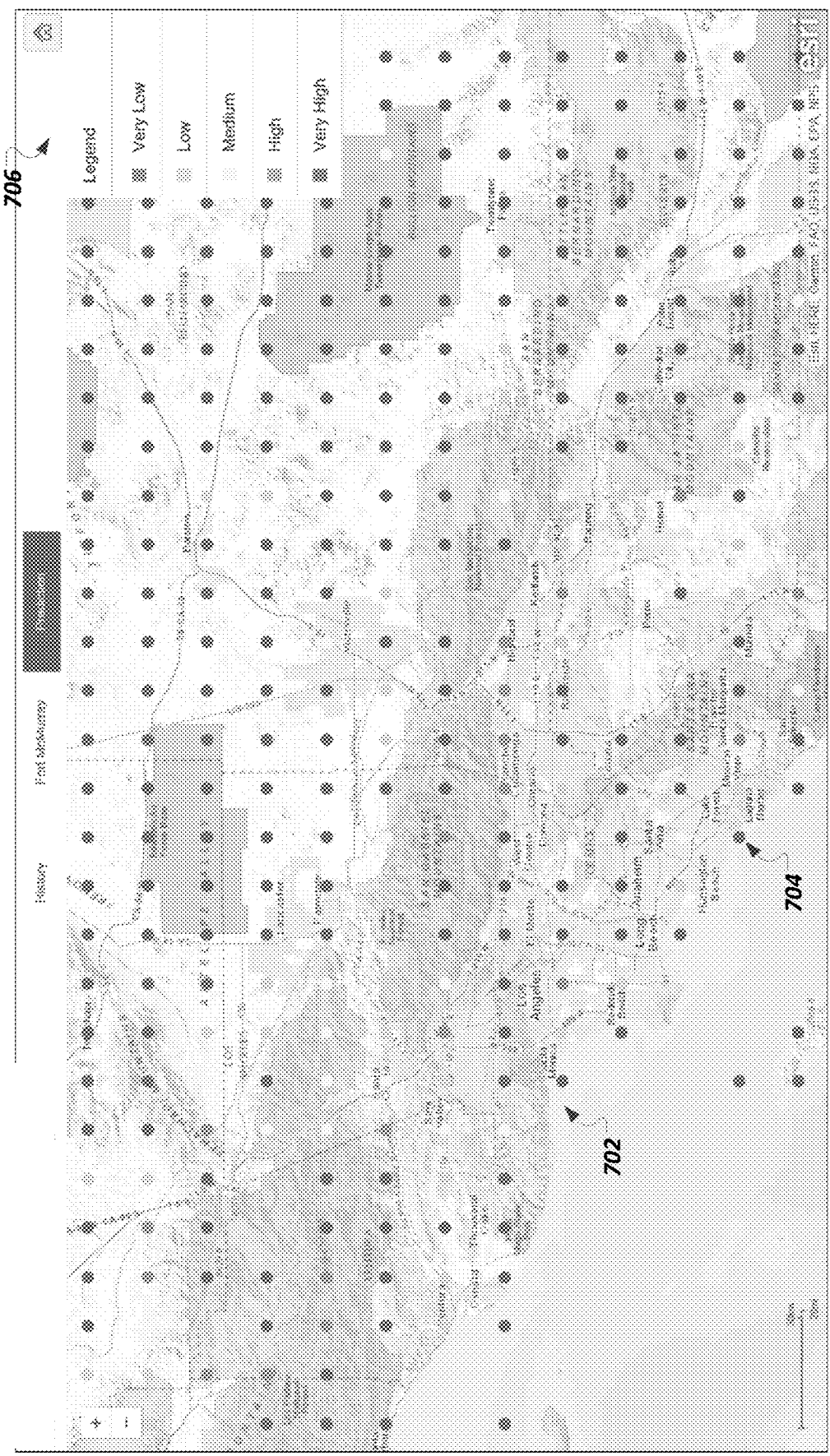

FIG. 7 illustrates an example user interface 700. The user interface 700 includes a map 702. The user interface 700 may be displayed, for example, in response to a zoom-in operation received by the user interface 600 described above with respect to FIG. 6. The user interface 700 includes colored selectable items, such as an item 704. The color of a selectable item indicates a wildfire risk for a geographic area around the location the item represents, according to a legend 706. As described below, a user can select a selectable item to view more detailed information about a wildfire prediction.

Figure 8:
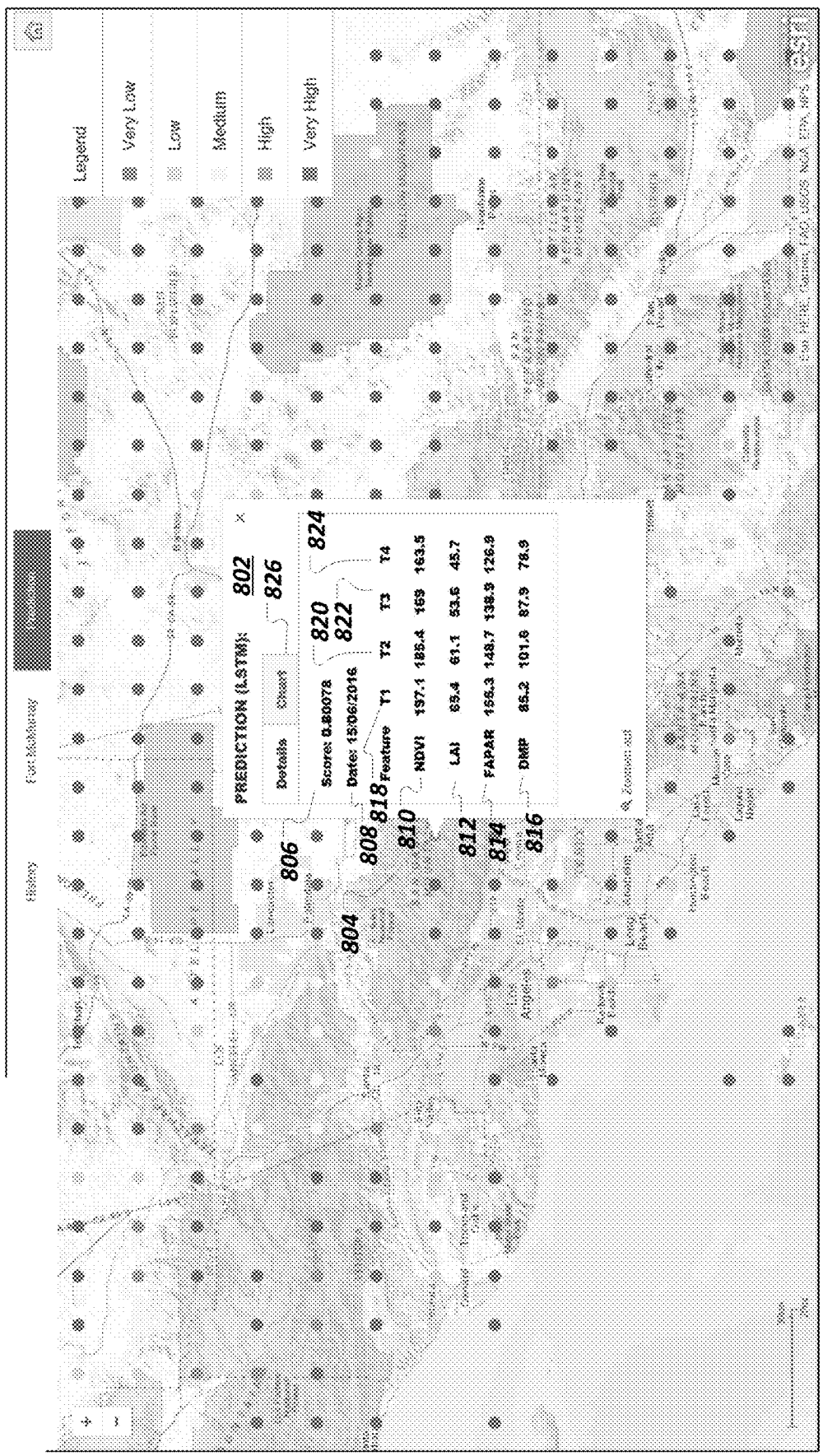

FIG. 8 illustrates an example user interface 800. An interface 802 can be displayed over the user interface 800 in response to selection of a selectable item 804. The interface 802 displays a prediction score 806 that indicates a wildfire probability for an upcoming time period for a geographic area represented by the selectable item 804. A date 808 indicates when the prediction score 806 was calculated. The prediction score 806 can be based on values for NDVI 810, LAI 812, FAPAR 814, and DMP 816 indicators. The interface 802 displays values for the NDVI 810, LAI 812, FAPAR 814, and DMP 816 indicators for first 818, second 820, third 822, and fourth 824 time periods, with each successive time period being a previous time period further into the past than the date 808. The prediction score 806 can be a score determined using a LSTM that uses the first 818, second 820, third 822, and fourth 824 time periods as a time sequence, for example. A user can select a chart tab 826 to view information about the prediction score 806 in a chart form.

Figure 9:
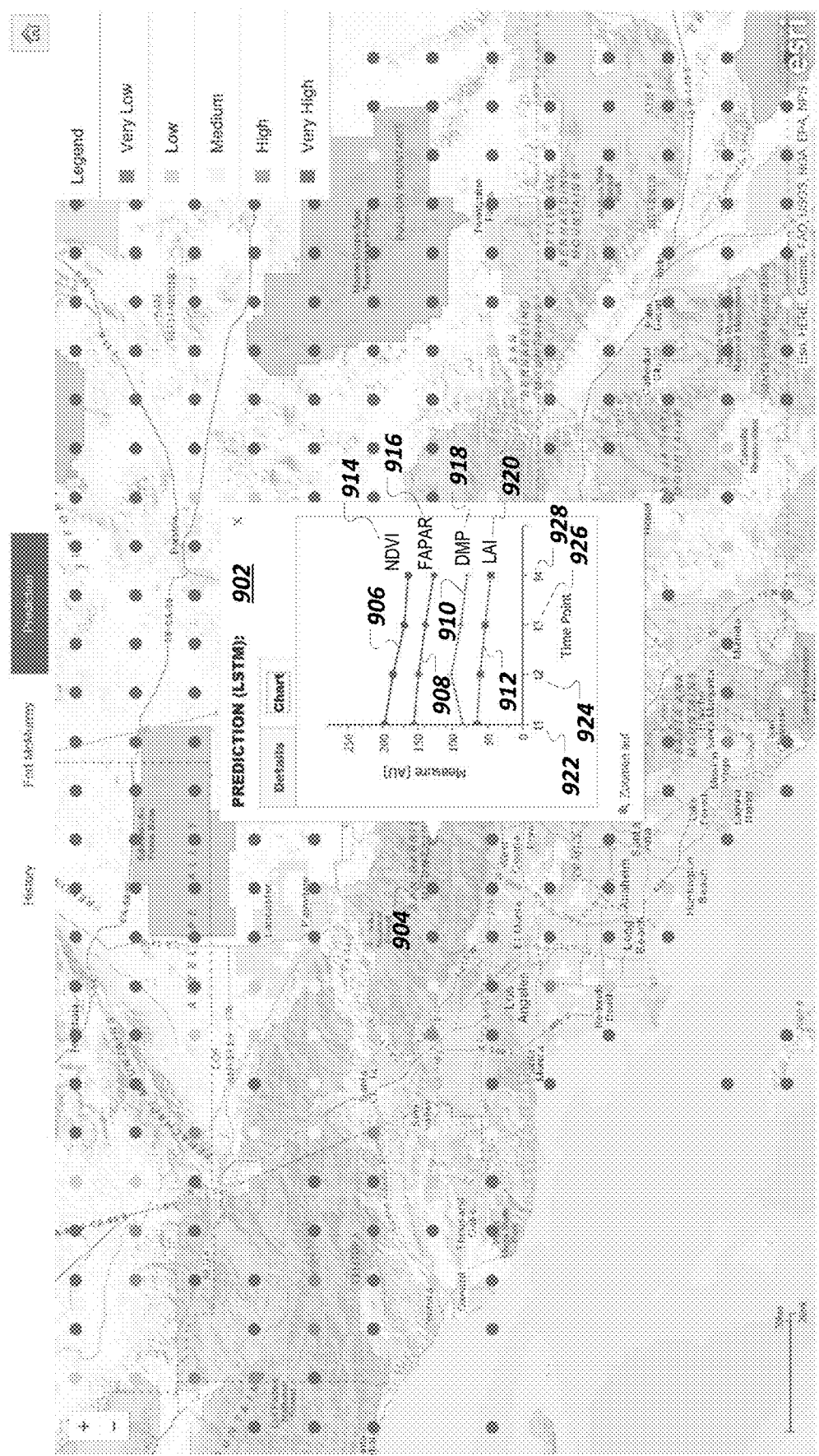

FIG. 9 illustrates an example user interface 900. The user interface 900 includes an interface 902 that displays line charts for data related to a wildfire prediction for an area represented by a selected item 904. The interface 902 includes lines 906, 908, 910, and 912 that show data for NDVI 914, FAPAR 916, DMP 918, and LAI 920 indicators for each of first 922, second 924, third 926, and fourth 928 time points, respectively. The first 922, second 924, third 926, and fourth 928 time points can be included in a time series in a LSTM network used to calculate the wildfire prediction.

Figure 10:
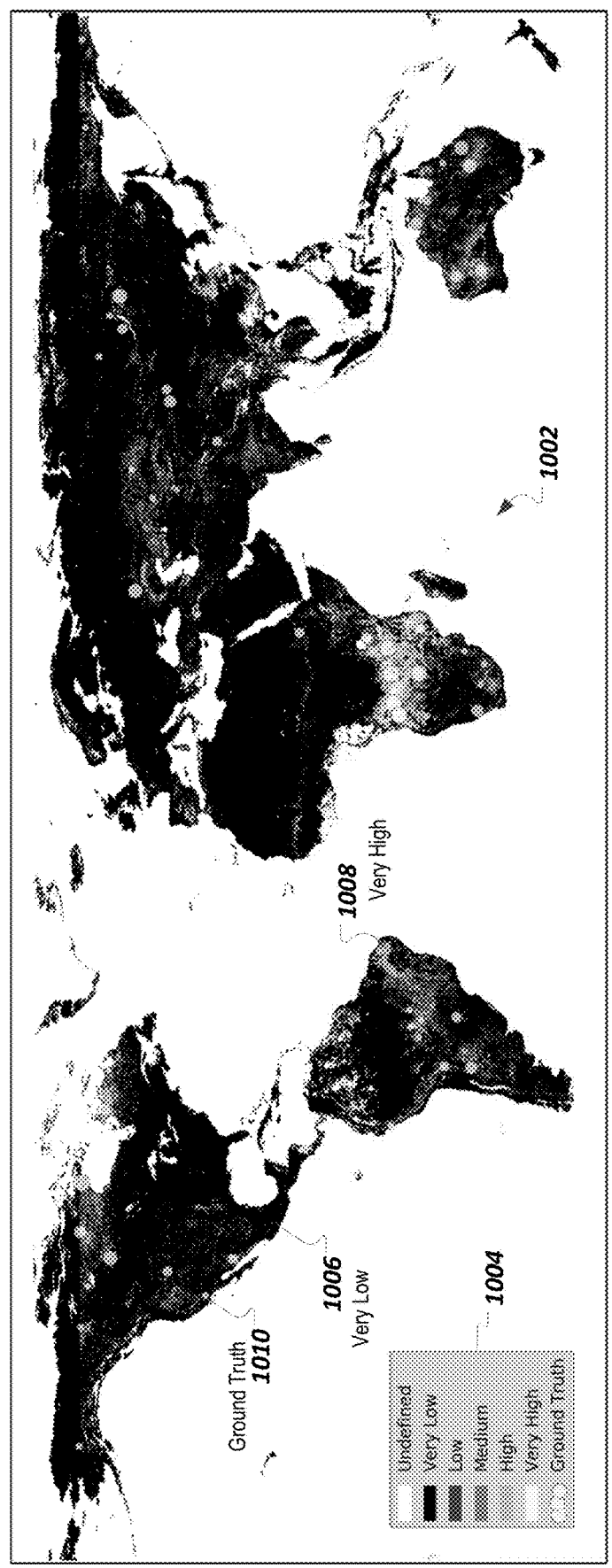

FIG. 10 illustrates an example user interface 1000. Similar to the user interface 600, the user interface 1000 presents a map 1002. The map 1002 is a world map that is color coded using colors, according to a legend 1004, that indicate different levels of wildfire risk for different areas, including an area 1006 having very high risk and an area 1008 having very low risk. Wildfire risk calculation methods can be trained using ground truth data. Wildfire risk predictions can also be compared to ground truth data, for performance evaluation. The user interface 1000 indicates areas that have ground truth data, such as an area 1010.

Figure 11:
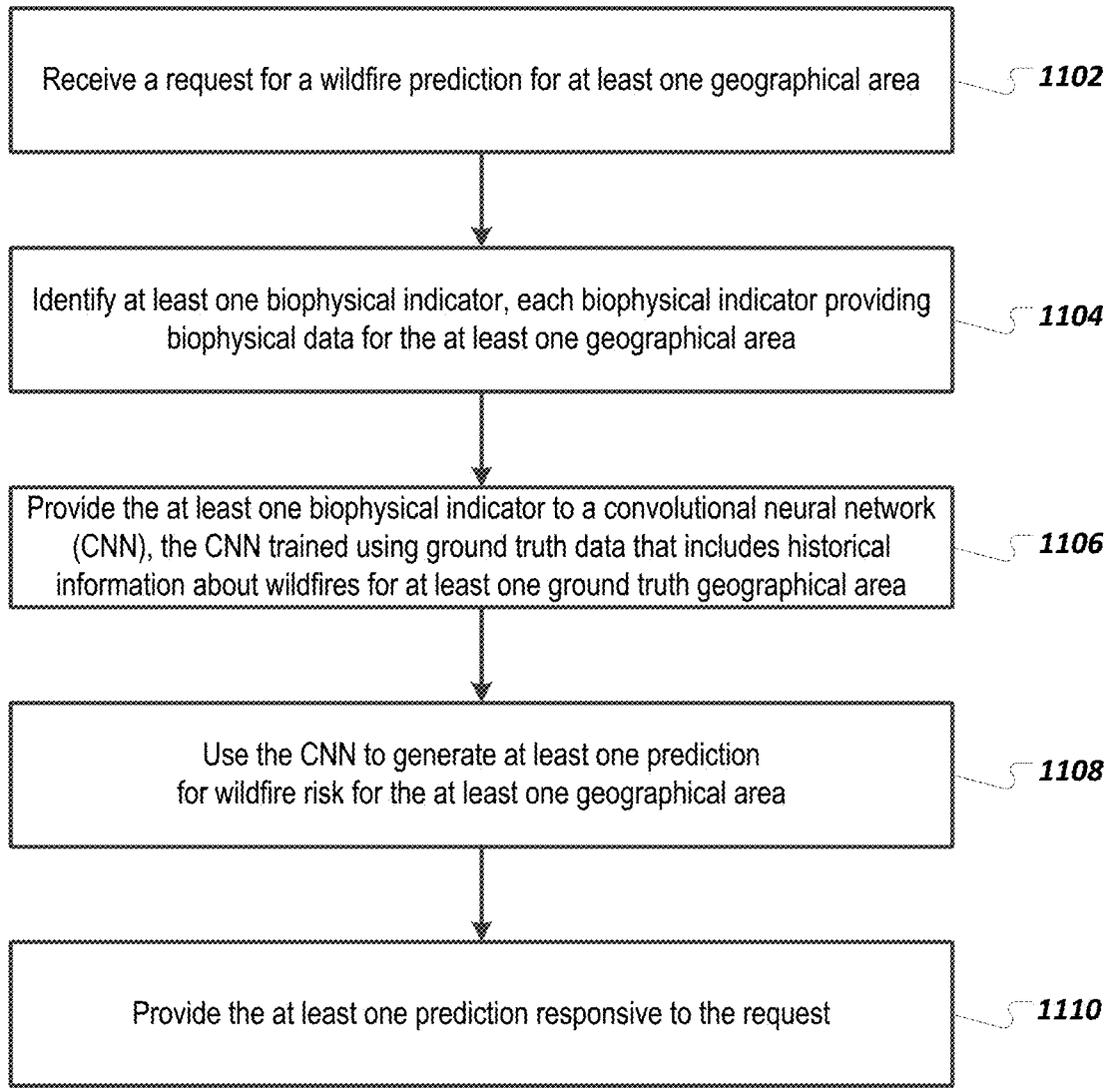
FIG. 11 is a flowchart of an example method for predicting wildfires on the basis of biophysical indicators and spatiotemporal properties using a CNN.

FIG. 11 is a flowchart of an example method 1100 for predicting wildfires on the basis of biophysical indicators and spatiotemporal properties using a CNN. It will be understood that method 1100 and related methods may be performed, for example, by any suitable system, environment, software, and hardware, or a combination of systems, environments, software, and hardware, as appropriate. For example, one or more of a client, a server, or other computing device can be used to execute method 1100 and related methods and obtain any data from the memory of the client, the server, or the other computing device. In some implementations, the method 1100 and related methods are executed by one or more components of the system 100 described above with respect to FIG. 1. For example, the method 1100 and related methods can be executed by the CNN engine 214 of FIG. 1.

At 1102, a request for a wildfire prediction for at least one geographical area is received. The request can be received, for example, from a user interface. As another example, the request can be received from a system or program.

At 1104, at least one biophysical indicator is identified, each biophysical indicator providing biophysical data for the at least one geographical area. The at least one biophysical indicator can include at least one of a vegetation index, a dry matter index, a leaf area index, and a fraction of absorbed photosynthetically active radiation index.

At 1106, the at least one biophysical indicator is provided to a CNN. The CNN can be trained using ground truth data that includes historical information about wildfires for at least one ground truth geographical area. One or more of the geographical areas for which a prediction is requested can be different from ground truth areas. The CNN can include an input layer, at least one rectified convolutional layer, at least one fully connected layer, and an output layer.

At 1108, the CNN to generate at least one prediction for wildfire risk for the at least one geographical area. The generated prediction can include, for each geographic area, a first output neuron and a second output neuron, the first output neuron and the second output neuron indicating a probability of a wildfire and a probability of no wildfire for the geographic area for an upcoming time period, respectively.

At 1110, the at least one prediction is provided responsive to the request. Prediction information can be presented on a map that displays the at least one geographic area. The prediction can be evaluated by comparing ground truth data for the at least one geographic area to the generated prediction.

Figure 12:
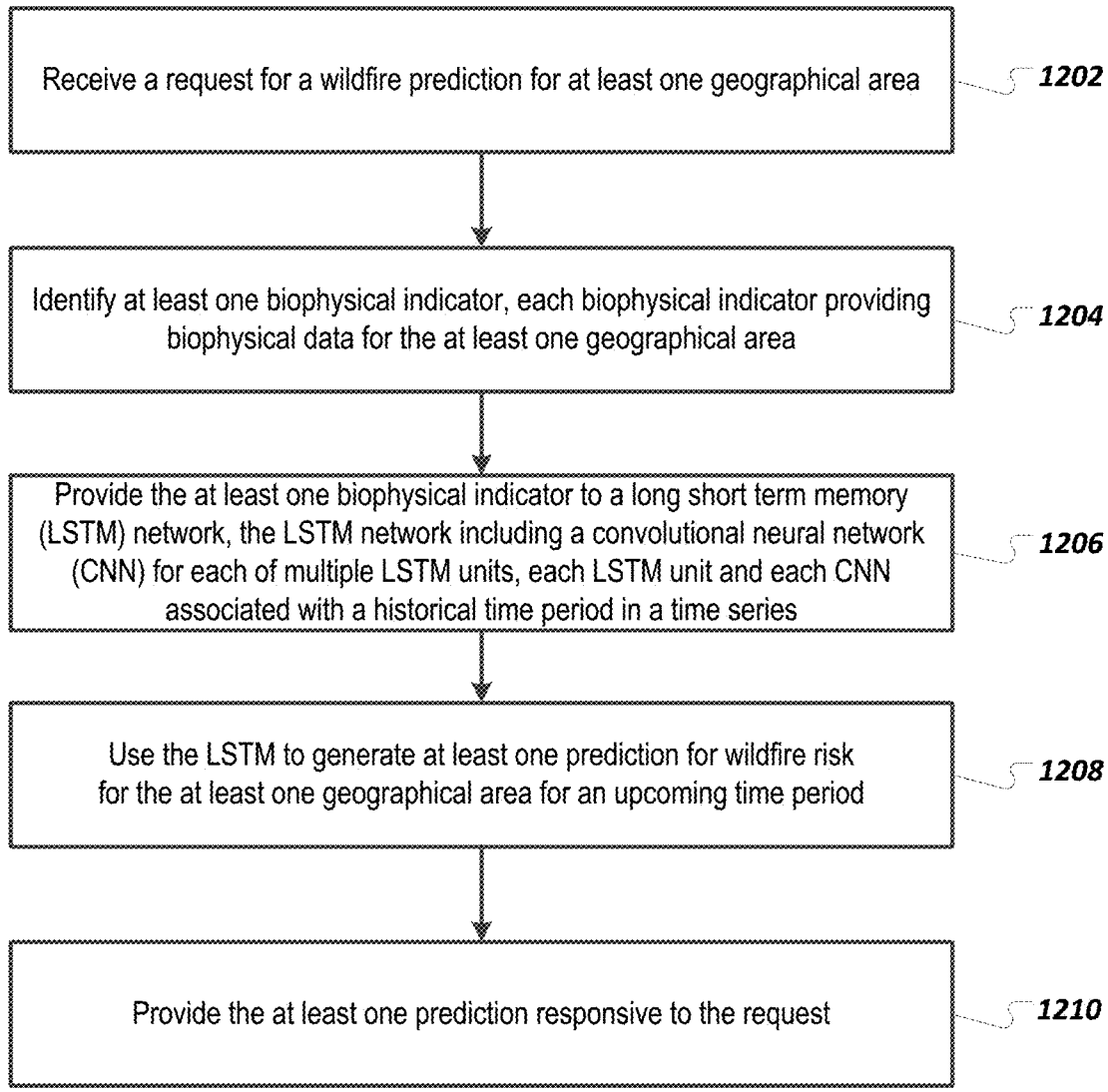
FIG. 12 is a flowchart of an example method for predicting wildfires on the basis of biophysical indicators and spatiotemporal properties using a LSTM network.

FIG. 12 is a flowchart of an example method 1200 for predicting wildfires on the basis of biophysical indicators and spatiotemporal properties using a LSTM network. It will be understood that method 1200 and related methods may be performed, for example, by any suitable system, environment, software, and hardware, or a combination of systems, environments, software, and hardware, as appropriate. For example, one or more of a client, a server, or other computing device can be used to execute method 1200 and related methods and obtain any data from the memory of the client, the server, or the other computing device. In some implementations, the method 1200 and related methods are executed by one or more components of the system 100 described above with respect to FIG. 1. For example, the method 1200 and related methods can be executed by the CNN engine 214 of FIG. 1.

At 1202, a request for a wildfire prediction for at least one geographical area is received. The request can be received, for example, from a user interface. As another example, the request can be received from a system or program.

At 1204, at least one biophysical indicator is identified, each biophysical indicator providing biophysical data for the at least one geographical area. The at least one biophysical indicator can include at least one of a vegetation index, a dry matter index, a leaf area index, and a fraction of absorbed photosynthetically active radiation index.

At 1206, the at least one biophysical indicator is provided to a LSTM network, the LSTM network including a CNN for each of multiple LSTM units, each LSTM unit and each CNN associated with a historical time period in a time series.

At 1208, the LSTM is used to generate at least one prediction for wildfire risk for the at least one geographical area for an upcoming time period. The outputs of each CNN except a last CNN associated with a last historical time period can be respectively provided to a CNN associated with a more recent time period in the time series. The provided outputs of each CNN can be outputs generated by a hidden layer of a respective CNN. The outputs of the last CNN can be provided to a fully connected layer of the LSTM. The fully connected layer can be used to generate the at least one prediction. The at least one prediction can include, for each geographic area, a first output neuron and a second output neuron, the first output neuron and the second output neuron indicating a probability of a wildfire and a probability of no wildfire for the geographic area for an upcoming time period, respectively.

At 1210, the at least one prediction is provided responsive to the request. Prediction information can be presented on a map that displays the at least one geographic area. The prediction can be evaluated by comparing ground truth data for the at least one geographic area to the generated prediction.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for providing a wildfire prediction, the computer-implemented method comprising:
    receiving a request for the wildfire prediction for at least one geographical area;
    retrieving image data for the at least one geographical area, wherein the image data comprises overhead images of the at least one geographical area for at least one time point;
    generating, from the image data, at least one biophysical indicator, each biophysical indicator providing image-based biophysical data for the at least one geographical area;
    providing the at least one biophysical indicator to a long short term memory (LSTM) network, the LSTM network comprising a LSTM layer and a fully connected layer, the LSTM layer comprising a series of LSTM units, each LSTM unit in the series of LSTM units being connected to a respective convolutional neural network (CNN), each LSTM unit and each respective CNN being associated with a particular historical time period in a time series, wherein each LSTM unit uses input from the respective CNN and each LSTM unit, except a last LSTM unit in the series of LSTM units, generates output data for use by a successive LSTM unit in the series of LSTM units, and wherein the output data generated by the last LSTM unit in the series of LSTM units of the LSTM layer is transmitted to the fully connected layer of the LSTM to generate at least one prediction for a wildfire risk for the at least one geographical area for an upcoming time period;
    evaluating the at least one prediction to generate at least one corresponding prediction evaluation by comparing the at least one prediction to ground truth data for the at least one geographical area using categorical cross-entropy as an objective function; and
    providing the at least one prediction and the at least one corresponding prediction evaluation responsive to the request.

2. The computer-implemented method of claim 1, wherein outputs of each CNN except a last CNN associated with a last historical time period are respectively provided to a CNN associated with a more recent time period in the time series.

3. The computer-implemented method of claim 2, wherein the outputs of each CNN are outputs generated by a hidden layer of a respective CNN.

4. The computer-implemented method of claim 2, wherein outputs of the last CNN are provided to the fully connected layer of the LSTM.

5. The computer-implemented method of claim 4, wherein the fully connected layer is used to generate the at least one prediction.

6. The computer-implemented method of claim 4, wherein the at least one prediction comprises a first output neuron and a second output neuron, the first output neuron and the second output neuron indicating a probability of a wildfire and a probability of no wildfire for the geographic area for an upcoming time period, respectively.

7. The computer-implemented method of claim 1, wherein providing the at least one prediction comprises presenting prediction information on a map that displays the at least one geographic area.

8. The computer-implemented method of claim 1, wherein evaluating the at least one prediction to generate at least one corresponding prediction evaluation by comparing the at least one prediction to ground truth data for the at least one geographical area using categorical cross-entropy as an objective function comprises:
    evaluating the at least one prediction to generate the at least one corresponding prediction evaluation by comparing the at least one prediction for the wildfire risk to the ground truth data for the at least one geographical area using categorical cross-entropy as the objective function, wherein the ground truth data comprises historical information about wildfires for the at least one geographical area.

9. A system, comprising:
at least one processor; and
a memory communicatively coupled to the at least one processor, the memory storing instructions which, when executed by the at least one processor, cause the at least one processor to perform operations comprising:
receiving a request for a wildfire prediction for at least one geographical area;
retrieving image data for the at least one geographical area, wherein the image data comprises overhead images of the at least one geographical area for at least one time point;
generating, from the image data, at least one biophysical indicator, each biophysical indicator providing image-based biophysical data for the at least one geographical area;
providing the at least one biophysical indicator to a long short term memory (LSTM) network, the LSTM network comprising a LSTM layer and a fully connected layer, the LSTM layer comprising a series of LSTM units, each LSTM unit in the series of LSTM units being connected to a respective convolutional neural network (CNN), each LSTM unit and each respective CNN being associated with a particular historical time period in a time series, wherein each LSTM unit uses input from the respective CNN and each LSTM unit, except a last LSTM unit in the series of LSTM units, generates output data for use by a successive LSTM unit in the series of LSTM units, and wherein the output data generated by the last LSTM unit in the series of LSTM units of the LSTM layer is transmitted to the fully connected layer of the LSTM to generate at least one prediction for a wildfire risk for the at least one geographical area for an upcoming time period;
evaluating the at least one prediction to generate at least one corresponding prediction evaluation by comparing the at least one prediction to ground truth data for the at least one geographical area using categorical cross-entropy as an objective function; and
providing the at least one prediction and the at least one corresponding prediction evaluation responsive to the request.

10. The system of claim 9, wherein outputs of each CNN except a last CNN associated with a last historical time period are respectively provided to a CNN associated with a more recent time period in the time series.

11. The system of claim 10, wherein the outputs of each CNN are outputs generated by a hidden layer of a respective CNN.

12. The system of claim 10, wherein outputs of the last CNN are provided to the fully connected layer of the LSTM.

13. The system of claim 12, wherein the fully connected layer is used to generate the at least one prediction.

14. The system of claim 13, wherein the at least one prediction comprises a first output neuron and a second output neuron, the first output neuron and the second output neuron indicating a probability of a wildfire and a probability of no wildfire for the geographic area for an upcoming time period, respectively.

15. A non-transitory computer-readable media storing instructions which, when executed by at least one processor, cause the at least one processor to perform operations comprising:
receiving a request for a wildfire prediction for at least one geographical area;
retrieving image data for the at least one geographical area, wherein the image data comprises overhead images of the at least one geographical area for at least one time point;
generating, from the image data, at least one biophysical indicator, each biophysical indicator providing image-based biophysical data for the at least one geographical area;
providing the at least one biophysical indicator to a long short term memory (LSTM) network, the LSTM network comprising a LSTM layer and a fully connected layer, the LSTM layer comprising a series of LSTM units, each LSTM unit in the series of LSTM units being connected to a respective convolutional neural network (CNN), each LSTM unit and each respective CNN being associated with a particular historical time period in a time series, wherein each LSTM unit uses input from the respective CNN and each LSTM unit, except a last LSTM unit in the series of LSTM units, generates output data for use by a successive LSTM unit in the series of LSTM units, and wherein the output data generated by the last LSTM unit in the series of LSTM units of the LSTM layer is transmitted to the fully connected layer of the LSTM to generate at least one prediction for a wildfire risk for the at least one geographical area for an upcoming time period;
evaluating the at least one prediction to generate at least one corresponding prediction evaluation by comparing the at least one prediction to ground truth data for the at least one geographical area using categorical cross-entropy as an objective function; and
providing the at least one prediction and the at least one corresponding prediction evaluation responsive to the request.

16. The non-transitory computer-readable media of claim 15, wherein outputs of each CNN except a last CNN associated with a last historical time period are respectively provided to a CNN associated with a more recent time period in the time series.

17. The non-transitory computer-readable media of claim 16, wherein the outputs of each CNN are outputs generated by a hidden layer of a respective CNN.

18. The non-transitory computer-readable media of claim 16, wherein outputs of the last CNN are provided to the fully connected layer of the LSTM.

19. The non-transitory computer-readable media of claim 18, wherein the fully connected layer is used to generate the at least one prediction.

20. The non-transitory computer-readable media of claim 19, wherein the at least one prediction comprises a first output neuron and a second output neuron, the first output neuron and the second output neuron indicating a probability of a wildfire and a probability of no wildfire for the geographic area for an upcoming time period, respectively.

* * * * *